United States Patent
Black et al.

(10) Patent No.: US 6,898,420 B2
(45) Date of Patent: May 24, 2005

(54) METHOD AND APPARATUS FOR AVOIDING SPURIOUS SIGNAL RECEIVER DESENSITIZING

(75) Inventors: Gregory R. Black, Vernon Hills, IL (US); Charles Philipp Binzel, Bristol, WI (US)

(73) Assignee: Motorola Inc., Schaumburg, IL (US)

( * ) Notice: Subject to any disclaimer, the term of this patent is extended or adjusted under 35 U.S.C. 154(b) by 28 days.

(21) Appl. No.: 10/226,688

(22) Filed: Aug. 23, 2002

(65) Prior Publication Data

US 2004/0203396 A1 Oct. 14, 2004

(51) Int. Cl.⁷ .................................................. H04B 1/10
(52) U.S. Cl. .................... 455/296; 455/182.3; 455/179; 455/150.1; 455/63.1; 455/65
(58) Field of Search .......................... 455/182.3, 179.1, 455/150.1, 73–77, 296, 265, 317, 318, 310, 255, 257–258, 260, 130, 183.1, 184.1, 112.1, 63.1, 65; 325/373, 376, 346, 349, 350, 354, 371, 219, 216

(56) References Cited

U.S. PATENT DOCUMENTS

| | | | |
|---|---|---|---|
| 4,545,072 A | * | 10/1985 | Skutta et al. ............ 455/183.2 |
| 4,896,318 A | * | 1/1990 | Kokubo et al. ............. 370/289 |
| 5,226,058 A | | 7/1993 | Anderson et al. |
| 5,263,055 A | | 11/1993 | Cahill |
| 5,335,363 A | * | 8/1994 | Basciano ..................... 455/73 |
| 5,745,848 A | | 4/1998 | Robin |
| 5,781,849 A | * | 7/1998 | Carlsson et al. ......... 455/114.1 |
| 5,812,590 A | | 9/1998 | Black et al. |
| 5,926,514 A | * | 7/1999 | Meador et al. ............. 375/346 |
| 6,345,175 B1 | * | 2/2002 | Murakami .................. 455/296 |
| 6,567,654 B1 | * | 5/2003 | Coronel Arredondo et al. . 455/315 |

* cited by examiner

Primary Examiner—Pablo N. Tran
(74) Attorney, Agent, or Firm—Matthew Loppnow (57) ABSTRACT

An apparatus and method for eliminating interference caused by spurious signals in communication signals communicated via a communication device on any one of a plurality of different channels, the communication device operating at a rate set by a system clock signal. The system clock frequency is generated at a first frequency, the first frequency generating spurious signals on at least one of the different channels. The system clock frequency is toggled by a first predetermined amount to a second frequency when the communication device is to be tuned to one of the different channels so as to remove the spurious signals from the tuned channel. The communication device is tuned to the at least one of the different channels. A return of the timing error to a predetermined value is synchronized at a start of a receive data capture event.

7 Claims, 7 Drawing Sheets

METHOD AND APPARATUS FOR AVOIDING SPURIOUS SIGNAL RECEIVER DESENSITIZING

BACKGROUND OF THE INVENTION

1. Field of Invention

The present invention is directed to a method and apparatus for avoiding spurious signal receiver desensitizing. More particularly, the present invention is directed to a method and apparatus for reducing interference caused by spurious signals in a communication device.

2. Description of Related Art

Presently, electronic devices employ circuits operating at a rate set by a system clock. The system clock is set by a quartz crystal-based reference oscillator. To insure that the system clock is precise, the reference oscillator typically is tuned. The system clock is used by logic circuitry throughout the electronic device to ensure that they operate in synchronization.

Unfortunately, a problem exists with such devices such as a communication device in that the system clock generates unwanted spurious signals that interfere with the decoding of information from received signals by a receiver of the communication device. For example, a communication device operating in the GSM (Group Special Mobile) radio-telephone system employs a 13 MHz system clock. The 72nd and 73rd harmonics of the 13 MHz system clock are within the GSM downlink channels 5 and 70. When the communication device is tuned to channel 5 or channel 70, the harmonics of the system clock are radiated into the receiver of the communication device. The spurious energy causes the receiver to become desensitized to the information in the received signal resulting in substantial performance degradation in the form of high bit error rates.

Existing methods for reducing receiver desensitization caused by the harmonics of the system clock include shielding the transceiver of the communication device with additional material. For example, silver paint, conductive gaskets, beryllium copper fingers, and filters for filtering the clock signal can be employed in the communication device. Unfortunately, such materials add weight, size, and cost to the communication device and require time-consuming circuit board redesigns and manual manufacturing operations. Such manual manufacturing operations can include manual soldering of antenna assemblies, manual placement of gaskets, and desensitization testing.

Another method for reducing receiver desensitization in a communication device is disclosed in U.S. Pat. No. 5,745,848, issued on Apr. 28, 1998, which is herein incorporated by reference. This method generates the system clock from a phase lock loop circuit, and shifts the system clock signal from a first frequency to a second frequency when the communication device is to be tuned to a channel subject to receiver desensitization. Unfortunately, while this method may reduce receiver desensitization, there are drawbacks. In particular, timing errors occur when the reference phase locked loop circuit is programmed away from the nominal operating frequency. Thus, the method must compensate for these timing errors.

The ways in which timing error can impact performance of the communication system include the effect on time of arrival (TOA) measurement. One of the uses of TOA is for determining the location of the user relative to the nearby base stations, as with the extended observed time difference (E-OTD) measurements in GSM networks. A location accuracy requirement of 50 meters is anticipated, which for a single TOA measurement corresponds to timing accuracy of 166 nS. Within a total system timing error budget an allocated timing error due to clock frequency offsets may be on the order of 10 nS. Therefore, problems with timing error can significantly impact the performance of a communication system.

Thus, there is a need for a method and apparatus for improving the reduction of interference caused by spurious signals in a communication device.

SUMMARY OF THE INVENTION

An apparatus and method for eliminating interference caused by spurious signals in communication signals communicated via a communication device on any one of a plurality of different channels, the communication device operating at a rate set by a system clock signal. The system clock frequency is generated at a first frequency, the first frequency generating spurious signals on at least one of the different channels. The system clock frequency is toggled between a second frequency and a third frequency when the communication device is to be tuned to one of the different channels so as to remove the spurious signals from the tuned channel. The communication device is tuned to the at least one of the different channels. A return of the timing error to a predetermined value is synchronized at a start of a receive data capture event. A return of the timing error to a predetermined value can also be synchronized at the return of the system clock frequency to the first frequency.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
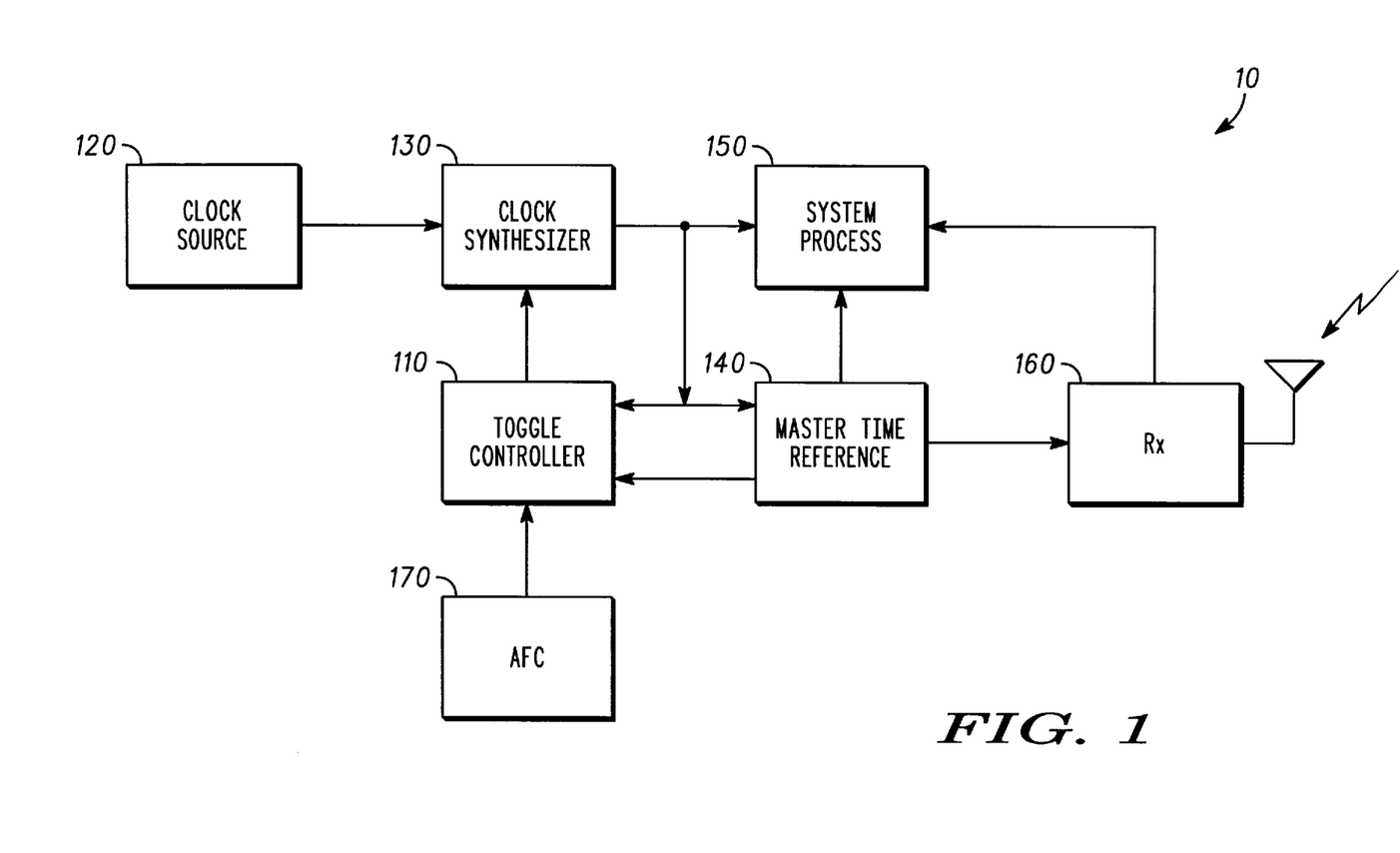
FIG. 1 is an exemplary block diagram of a system according to a first embodiment.

FIG. 1 is an exemplary block diagram of a system 10 according to a first embodiment. The system 10 may be a communication system, a mobile communication system, or any other system utilizing clock signals that may interfere with system operation. The system 10 includes a toggle controller 110, a clock source 120, a clock synthesizer 130, master time reference circuitry 140, system process circuitry 150, receiver circuitry 160, and automatic frequency control circuitry (AFC) 170. The clock synthesizer 130 may include frequency correction circuitry and digital phase locked loop (DPLL) circuitry. For example, the clock synthesizer 130 can include a reference DPLL that synthesizes a clock reference that determines the clock frequency for digital circuits in the system 10. The clock source 120 can include a clock crystal and a reference oscillator. The components of the system 10 may additionally interact with each other or with other components for operation.

In operation, the clock source 120 can provide a raw clock signal to the clock synthesizer 130. The clock synthesizer 130 can provide a reference clock to the toggle controller 110, the master time reference circuitry 140, and the system process circuitry 150. The frequency of the reference clock is based on a frequency control signal provided to the clock synthesizer 130 by the toggle controller 110. The system process circuitry 150 controls processes of the system. Such processes can include display processes, data processing processes, input processes, and any other processes utilized in a system utilizing timing. Such processes may also include computer processes, personal digital assistant processes, or any other processes that may utilize timing circuitry that may generate signals that interfere with a channel of a receiver. The master time reference circuitry 140 provides timing information to the system 10. In particular, the master time reference circuitry 140 can provide timing information to the toggle controller 110, the system process circuitry 150, the receiver circuitry 160, and other components of the system 10. The timing information can include clock signals, adjusted clock signals, or any other timing information. For example, the master time reference circuitry 140 can provide a toggle enable signal and other timing information to the toggle controller 110. The master time reference circuitry 140 can also provide a capture data timing control signal to the receiver circuitry 160.

The receiver circuitry 160 can receive signals transmitted to the system 10. For example, the receiver circuitry 160 can receive radio frequency signals including data from a base station. The receiver circuitry 160 can then send the received data to the system process circuitry 150 for processing.

The AFC 170 can provide frequency signals and toggle count signals to the toggle controller 110. The toggle controller 110 can utilize the frequency signals, the toggle enable signal, the reference clock signal, and/or other information to provide a frequency control signal to the clock synthesizer 130. The frequency control signal is used to control the frequency of the reference clock provided by the clock synthesizer 130.

Figure 2:
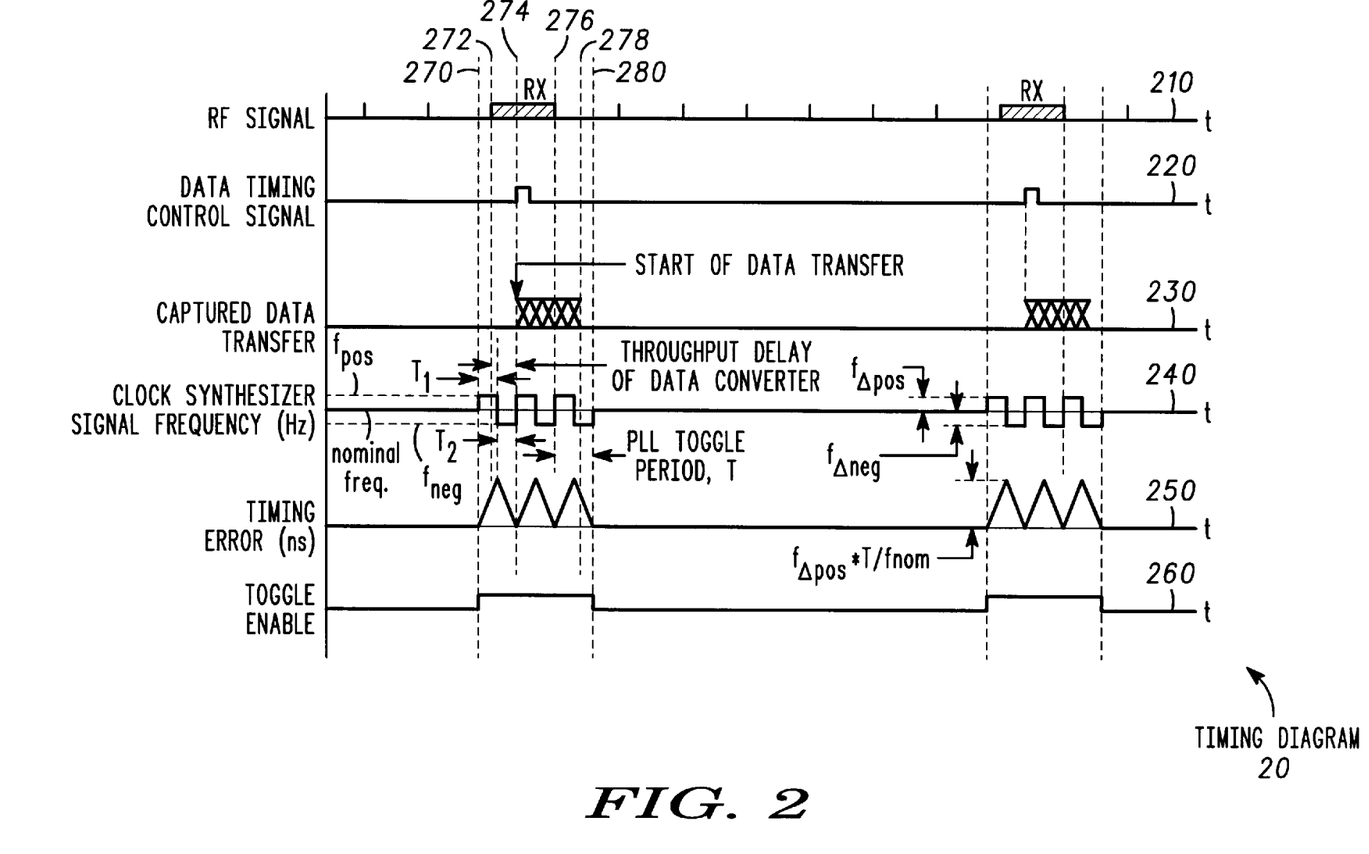
FIG. 2 is an exemplary timing diagram outlining the operation of some of the signals of the system according to one embodiment.

FIG. 2 is an exemplary timing diagram 20 outlining the operation of some of the signals of the system 10 according to one embodiment. The signals illustrated include the RF signal 210, the capture data timing control signal 220, the captured data 230, the frequency of the clock synthesizer signal 240 output by the clock synthesizer 130, the timing error 250 of the system 10, and the toggle enable signal 260.

When the system 10 determines a channel is selected where receiver desensitizing should be avoided the toggle enable signal 260 is sent to the toggle controller 110 at time 270. The toggle enable signal 260 may be generated by the master time reference 140 or generated by the toggle controller 110 internally. This causes the clock synthesizer signal 240 to switch from a nominal operating frequency to a new frequency $f_{pos}$ by a change of $f_{\Delta pos}$. The change of $f_{\Delta pos}$ may include a delta amount, a compensation amount, and an offset amount. The delta amount is used to avoid spurious signal receiver desensitizing by shifting the harmonics from the operating channel. The compensation amount can be used to compensate for a larger than normal period if the toggle period during the new frequency $f_{pos}$ was extended due to system latency. The offset amount can be used to ensure the system has zero or a known timing error for the beginning of data transfer capture. The frequency of the clock synthesizer can shift between a positively shifted frequency $f_{pos}$ and a negatively shifted frequency $f_{neg}$ to ensure appropriate timing error 250 at the beginning of data transfer capture 230 at point 274. For example, the frequency of the clock synthesizer can shift between a positively shifted frequency $f_{pos}$ and a negatively shifted frequency $f_{neg}$ to ensure zero timing error or a known timing error at the beginning of data transfer capture 230. This process is further described below. The negatively shifted frequency $f_{neg}$ may be calculated by subtracting a delta frequency $f_{\Delta neg}$ and a compensation frequency from the nominal frequency. The frequency $f_{pos}$ may last for a period $T_1$ and the frequency $f_{neg}$ may last of a period $T_2$. A total toggle period including a positive offset and a negative offset is indicated by T. This period may indicate the toggle of a DPLL within the clock synthesizer 130.

The RF signal 210 is received at the receiver circuitry 160 at point 272. Throughput delay of data conversion results in the start of data transfer 230 at point 274. This data transfer is triggered by the capture data timing control signal 220. The capture data timing control signal 220 sent from the master time reference circuitry 140 to the receiver circuitry 160. The captured data 230 is transferred from the receiver circuitry 160 to the system process circuitry 150. Captured data transfer ends at point 278.

The timing error 250 of the system 10 results from the nominal frequency of the clock synthesizer signal 240 being adjusted by an amount $f_{\Delta pos}$ during the period $T_1$. The timing error is reduced by adjusting the nominal frequency by an amount $f_{\Delta neg}$ during the period $T_2$. The period $T_1$ is not necessarily equal to the period $T_2$ because the slower clock frequency may require different amount of time to stabilize the timing error 250. Also, the offset amount may compensate for the slower clock frequency requiring a different amount of time to stabilize the timing error 250.

Figure 3:
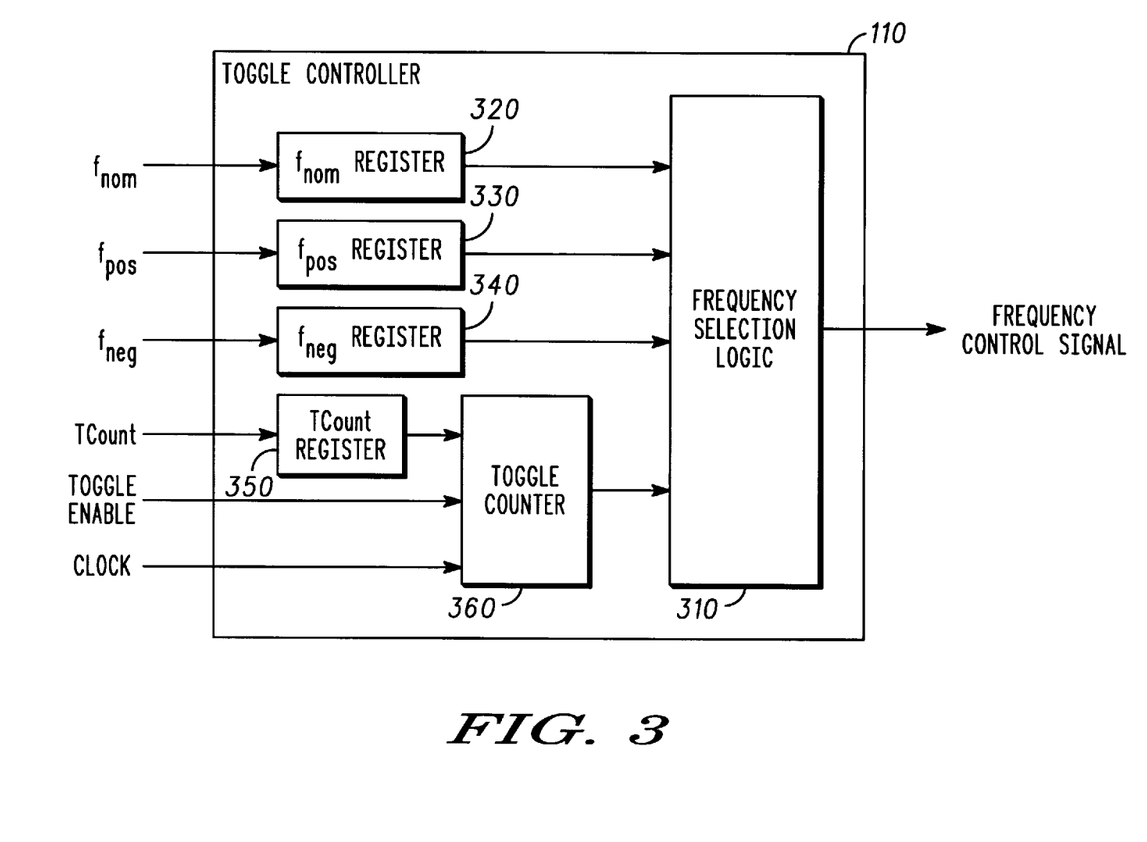
FIG. 3 is an exemplary block diagram of the toggle controller according to a first embodiment employing hardware for the operation of the toggle controller.

FIG. 3 is an exemplary block diagram of the toggle controller 110 according to a first embodiment employing hardware for the operation of the toggle controller 110. The toggle controller 110 can include a frequency selection logic block 310, an $f_{nom}$ register 320, an $f_{pos}$ register 330, an $f_{neg}$ register 340, a TCount register 350, and a toggle counter 360.

In operation, the toggle controller 110 outputs a frequency control signal having a value derived from the data stored in one of three registers:

1) $f_{nom}$ Register 320
2) $f_{pos}$ Register 330
3) $f_{neg}$ Register 340

These registers receive, from the AFC 170, and store the nominal frequency value, $f_{nom}$, the positive toggle frequency value, $f_{pos}$, and the negative toggle frequency value, $f_{neg}$, and make these values available in binary form to the frequency selection logic block 310. The negative toggle frequency value is actually a positive value resulting from the nominal frequency $f_{nom}$ offset by a frequency delta ($f_{\Delta neg}$).

The fourth register, the TCount register 350 receives and stores the toggle count value, TCount from the AFC 170, and makes this value available in binary form to the toggle counter 360. The toggle count value determines the amount of clock cycles for which the Frequency Control Signal will hold the $f_{pos}$ or $f_{neg}$ frequency control values.

The toggle counter 360 receives the TCount signal stored in the TCount register 350, the reference clock signal from the clock synthesizer 130, and the toggle enable signal from the master time reference circuitry 140. The toggle counter 360 generates the Toggle Control Signal to assert three possible states depending on the input conditions:

1) Toggle Nominal
2) Toggle Positive
3) Toggle Negative

When the Toggle Enable signal is in a de-asserted steady state the Toggle Control Signal asserts the Toggle Nominal State. When the Toggle Enable becomes asserted the Toggle Control Signal asserts the Toggle Positive State, for a 'toggle positive period', $T_1$, determined by the toggle count and the clock period. At the end of the period, $T_1$, the Toggle Control Signal asserts the Toggle Negative State for a 'toggle negative period', $T_2$, determined by the toggle count and the clock period. The Toggle Positive and Toggle Negative cycle continues while Toggle Enable signal is asserted. When the toggle enable is de-asserted the Toggle Control signal finishes the Toggle Positive and Toggle Negative cycle and then asserts the Toggle Nominal stage at the end of the 'toggle negative period' $T_2$.

The frequency selection logic block 310 behaves essentially like a multiplexor, outputting the contents of the $f_{nom}$, $f_{pos}$, or $f_{neg}$ register as the Frequency Control Signal to the clock synthesizer 130, depending on the state of the Toggle Control signal. For the toggle positive state, the frequency control signal toggles the clock synthesizer 130 to output the reference clock at a frequency of $f_{pos}$. For the toggle negative state, the frequency control signal toggles the clock synthesizer 130 to output the reference clock at a frequency of $f_{neg}$.

A condition of having a periodic timing error is determined by equating the number of clock cycles when toggling is enabled to the number of clock cycles when toggling is disabled for a given period of time:

$$(T_1 * f_{pos}) + (T_2 * f_{neg}) = (T_1 + T_2) * f_{nom} \quad (1)$$

When this condition of Equation (1) is true, the timing error returns to zero or a fixed offset when the cycle of positive and negative frequency shifts is completed. Although zero error is highly desirable, it may not be necessary for a given communications system. The system 10 works equally well to reduce the error to within the tolerance of a system. In the case of GSM the spec requires timing to be maintained to within 0.0 ppm. In other systems such as EOTD (Enhanced Observed Time Difference) where the accuracy of the timing signal is proportional to the position error, the timing error needs to be as small as can be designed to make positional accuracy of 50 meters as mandated by the FCC. Given the speed of the RF propagation at $3 \times 10^8$ meters/sec., this 50 m accuracy translates to timing error of 166 nS.

If we let $$f_{pos} = f_{nom} + f_{\Delta pos} \quad (2)$$

and $$f_{neg} = f_{nom} + f_{neg} \quad (3)$$

then substituting (2) and (3) into (1) we get:

$$T_1(f_{\Delta neg}) + T_2(f_{\Delta pos}) = 0 \quad (4)$$

The cycle of positive and negative frequency shifts could include more than two frequency states. In general, the condition of periodic timing error which returns to zero at the end of the cycle can be achieved with n frequency states is as follows:

$$\sum_n T_n * f_{\Delta n} = 0 \quad (5)$$

where $T_n$ is the duration of the nth clock frequency, $f_n$, and where $$f_{\Delta n} = f_n - f_{nom}$$

Equation (5) provides a criterion for assuring periodicity of the timing error. The condition of periodicity ensures that the timing error does not increase or decrease from one toggle cycle to the next. Therefore, the frequency toggling method described above is a method of eliminating timing errors, provided the toggling is controlled in accordance with Equation (5).

Equation (5) criterion can be applied to an ideal frequency control waveform consisting of n frequency steps in the toggle period, T. Equation (5) can also be applied to frequency control waveforms of different shapes, such a ramping shapes or exponential shapes by approximating these waveforms with a series of frequency steps, the error of the approximation going to zero as the number of steps increases. Thus, the criterion of Equation (5) can be applied by using large n to account for a ramping, exponential, or other behavior of the clock frequency. Furthermore, Equation (5) may be applied in an integral form to account for different waveform shapes.

Thus, the toggle controller 110 can generate the system clock frequency at a first frequency, the first frequency generating spurious signals on at least one of the plurality of different channels, toggle the system clock frequency by a first amount to a second frequency when the communication device is to be tuned to at least one of the plurality of different channels so as to remove the spurious signals from the at least one of the plurality of different channels, tune the communication device to said at least one of the plurality of different channels, and synchronize a return of the timing error to a predetermined value at a start of a receive data capture event. The predetermined value can be zero.

The toggle controller 110 may also synchronize the return of the timing error to a predetermined value by shifting the system clock signal a second predetermined amount to a third frequency after the step of tuning. The predetermined value may result in a timing error which is within the constraints of a time of arrival measurement error budget. The toggle controller 110 may additionally toggle the system clock frequency a second amount to a third frequency, the second amount being equal to twice the first amount plus an offset amount. The toggle controller 110 may synchronize as a function of the first amount.

Furthermore, the toggle controller 110 may eliminate interference caused by spurious signals in communication signals communicated via a communication device on any one of a plurality of different channels, the communication device operating at a rate set by a system clock signal. The toggle controller 110 may eliminate this interference by generating the system clock signal at a nominal frequency, the nominal frequency generating spurious signals on a selected one of the plurality of different channels, toggling the system clock signal to a second frequency, the second frequency being the nominal frequency adjusted at least by a difference frequency, and toggling the system clock signal to a third frequency, the third frequency being the nominal frequency adjusted at least by the difference frequency and an offset frequency. The second frequency may equal the nominal frequency adjusted by a difference frequency so as to remove the spurious signals from said at least one of the plurality of different channels. The toggle controller 110 may also eliminate the interference by returning the system clock to the nominal frequency when the nominal signal does not generate spurious signals on a selected one of the plurality of different channels.

The toggle controller 110 may additionally eliminate interference caused by spurious signals in communication signals communicated via a communication device on any one of a plurality of different channels, the communication device operating at a rate set by a system clock signal. Accordingly, the toggle controller 110 may operate based on a system clock signal generated at a nominal frequency, the nominal frequency generating spurious signals on a selected one of the plurality of different channels. The toggle controller 110 may then toggle the system clock signal to a second frequency for a first time period, the second frequency being the nominal frequency adjusted at least by a first difference frequency. The toggle controller 110 may then toggle the system clock signal to a third frequency for a second time period, the third frequency being the nominal frequency adjusted at least by a second difference frequency. The toggle controller 110 may then determine a condition of periodic timing error based on the sum of at least the first difference frequency multiplied by the first time period and the second difference frequency multiplied by the second time period being equal to zero. The toggle controller 110 may then synchronize a return of the timing error to a predetermined value based on the condition of periodic timing error.

The toggle controller 110 may determine a condition of periodic timing error based on the sum of at least a plurality of the first difference frequency multiplied by the first time period and plurality of the second difference frequency multiplied by the second time period where the sum is substantially equal to zero. The toggle controller 110 may synchronize a return of the timing error to a predetermined value based on the condition of periodic timing error to coincide with a start of a receive data capture event. The first time period may be a first predetermined time period and the second time period may be a second predetermined time period.

Figure 4:
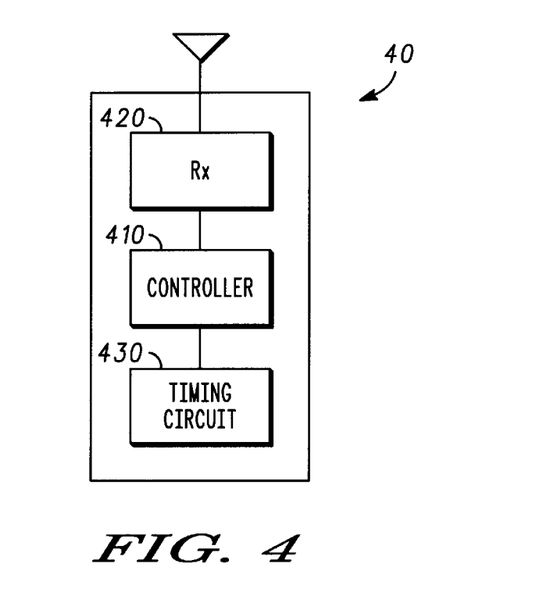
FIG. 4 is an exemplary block diagram of a system according to a second embodiment.

FIG. 4 is an exemplary block diagram of a system 40 according to a second embodiment. The system 40 may be a communication system, a mobile communication system, or any other system utilizing clock signals that may interfere with system operation. The system 40 can include a controller 410, receiver circuitry 420, and timing circuitry 430. The timing circuitry can include a clock source, a clock synthesizer, master time reference circuitry and automatic frequency control circuitry. In operation, the receiver 420 receives communication signals, the timing circuitry 430 controls the timing of the system 40, and the controller 410 controls the operation of the system 40. For example, the controller 410 may reduce channel interference caused by spurious signals resulting from the timing circuitry 430. The controller 410 may reduce the channel interference by synchronizing a return of timing error to a predetermined value based on a condition of periodic timing error. The controller 410 may also reduce the channel interference by synchronizing a return of a timing error to a predetermined value at a start of a receive data capture event.

Figure 5:
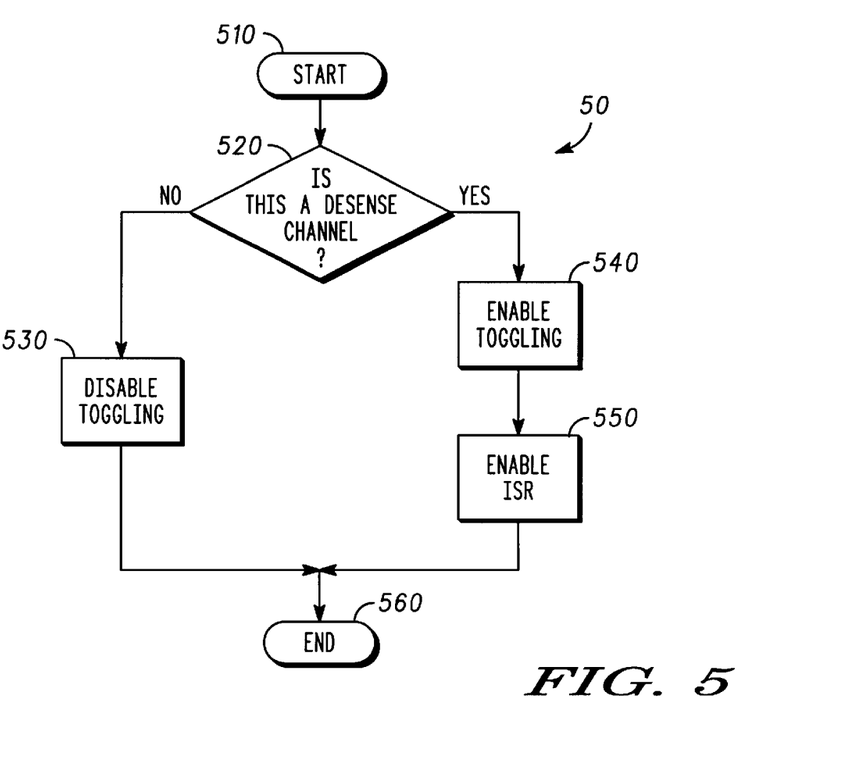
FIG. 5 is an exemplary flowchart outlining the determination of when to utilize a toggle function.

FIG. 5 is an exemplary flowchart 50 outlining the operation of a process for determining when to utilize the functions of the toggle controller 110 or the controller 410. The process may be performed by the toggle controller 110, the master time reference circuitry 140, the controller 510, or any other controller within the system 10 or the system 50. The process starts in step 510. In step 520, the process determines if a channel is being used that is affected by desensitization. If not, in step 530, the process disables toggling of the frequencies by the controller 410 or the controller 110. If so, the process enables the toggling of the frequencies in step 540. For example, the process asserts a toggle enable signal to the toggle controller 110. If necessary, the process also enables an interrupt service routine (ISR) in step 550. In step 560, the process ends.

Figure 6:
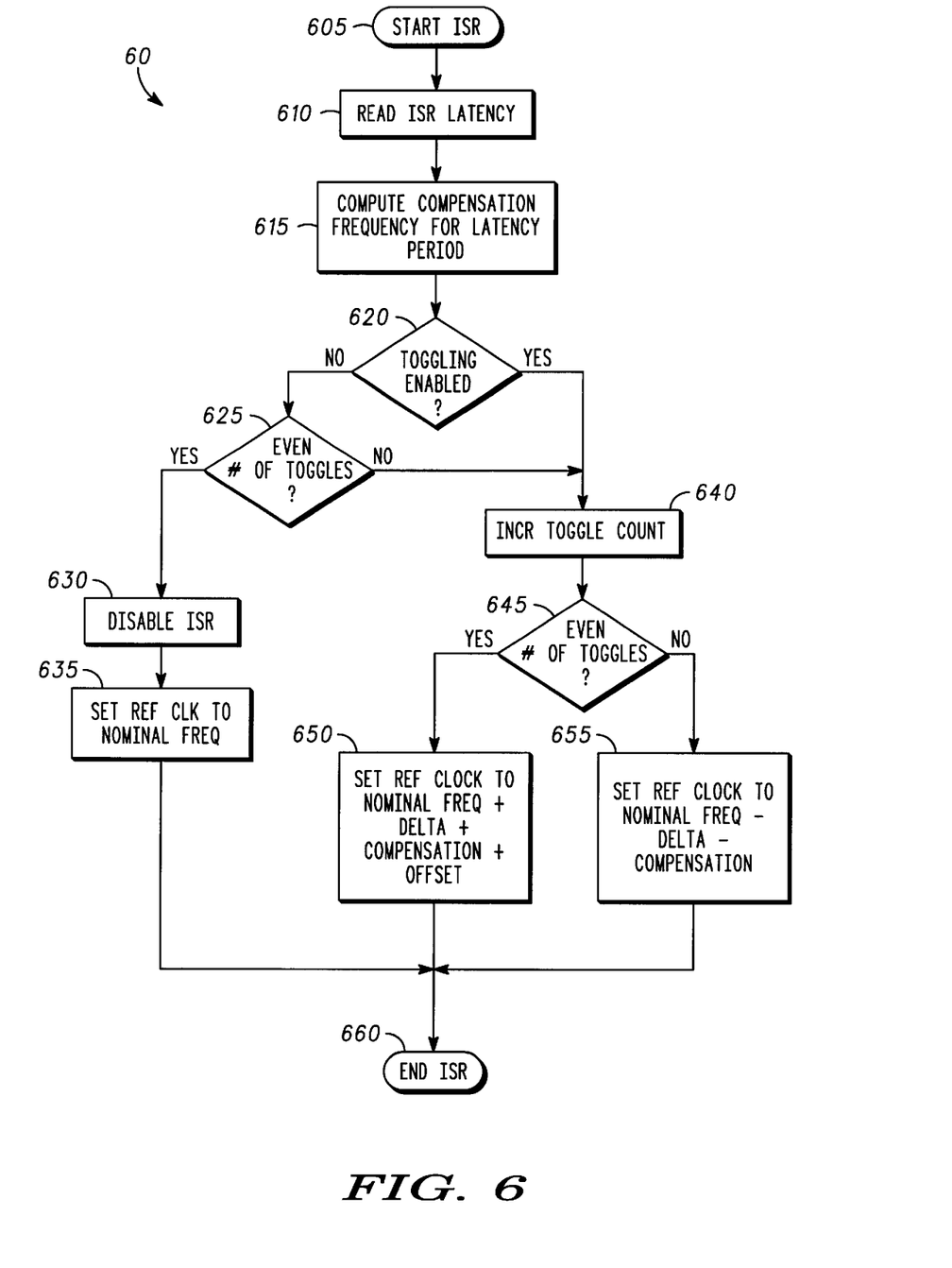
FIG. 6 is an exemplary flowchart outlining the operation of toggle controller according to the second embodiment employing software for the operation of the toggle functions of the controller.

FIG. 6 is an exemplary flowchart 60 outlining the operation of an ISR routine in the toggle controller 110 or the controller 410 according to a second embodiment employing software for operation. Preferably, this flowchart is implemented in the controller 410. The ISR routine illustrated in flowchart 40 may be triggered periodically by the master time reference circuitry 140. In step 605, the controller 410 starts the ISR routine. In step 610, the controller 410 determines the ISR latency. In step 615, the controller 410 computes the compensation frequency for a latency period. This compensation is utilized if the toggle period during a toggled frequency was extended due to system latency. In step 620, the controller 410 determines if toggling is enabled. If not, in step 625, the controller 410 determines if there has been an even number of toggles. If so, the controller 410 disables the ISR in step 630. The controller 410 then sets the reference clock to the nominal frequency $f_{nom}$ in step 635. If toggling is enabled in step 620 or if there are an odd number of toggles in step 625, the controller 410 increments the toggle count in step 640. In step 645, the controller 410 determines if there was an even number of toggles. If so, in step 650, the controller 410 sets the reference clock frequency to $f_{nom}+f_{\Delta pos}+$a compensation amount where $f_{\Delta pos}$ can be equal to a frequency shift plus an offset. If there were an odd number of toggles in step 645, the controller 410 sets the reference clock frequency to $f_{nom}+f_{\Delta neg}+$a compensation amount in step 655, where $f_{\Delta neg}$ can be equal to the frequency shift without an offset. In step 660, the ISR ends.

Figure 7:
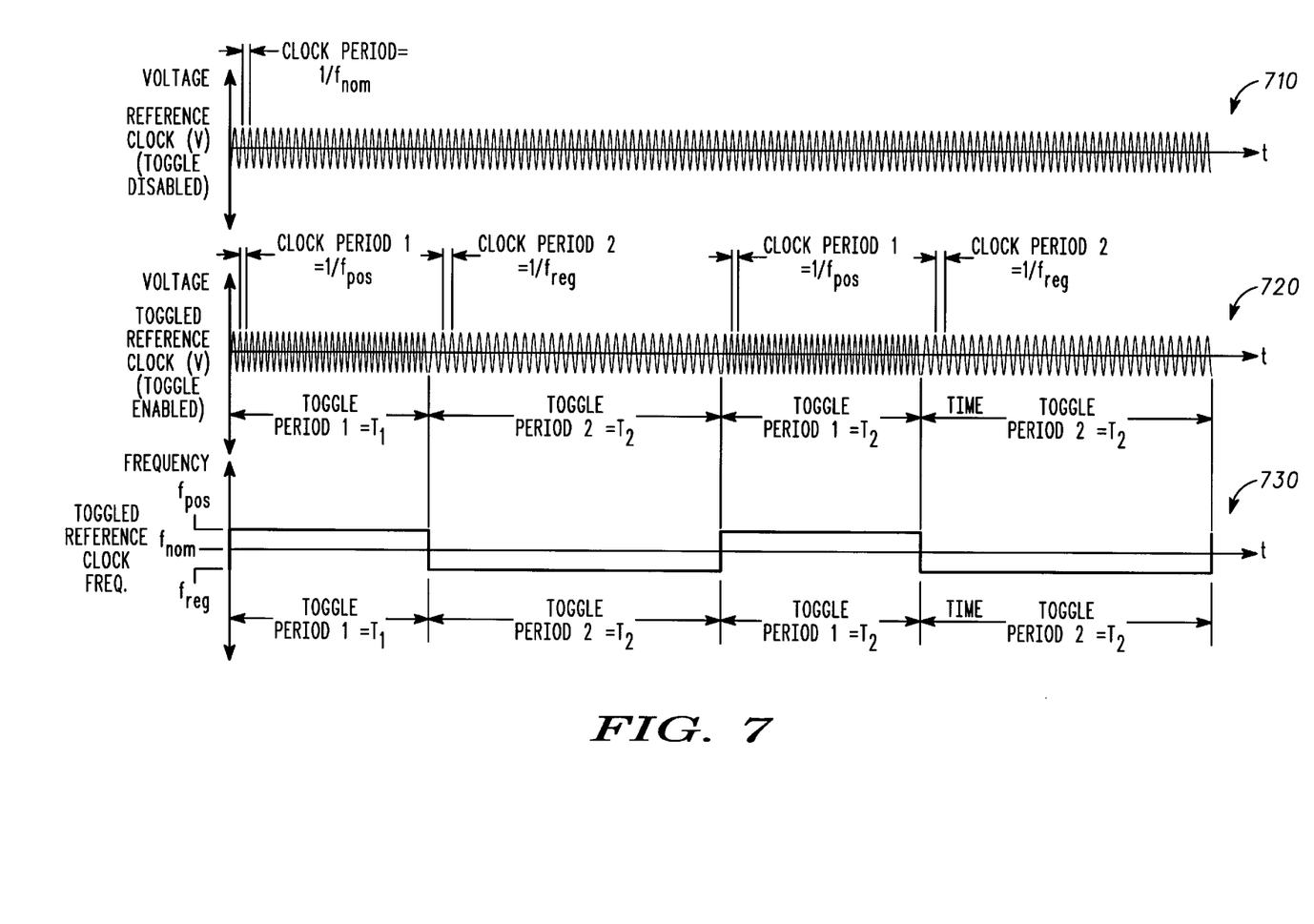
FIG. 7 illustrates exemplary timing diagrams outlining the operation of some of the signals of the system according to one embodiment.

FIG. 7 illustrates exemplary timing diagrams outlining the operation of some of the signals of the system 10 according to one embodiment. Timing diagram 710 illustrates the untoggled reference clock and timing diagram 720 illustrates the toggled reference clock. Timing diagram 730 illustrates the frequency of the toggled reference clock for timing diagram 720. As illustrated, $f_{pos}$ results in a higher frequency reference clock for toggle period $T_1$ and $f_{neg}$ results in a lower frequency reference clock for toggle period $T_2$.

Figure 8:
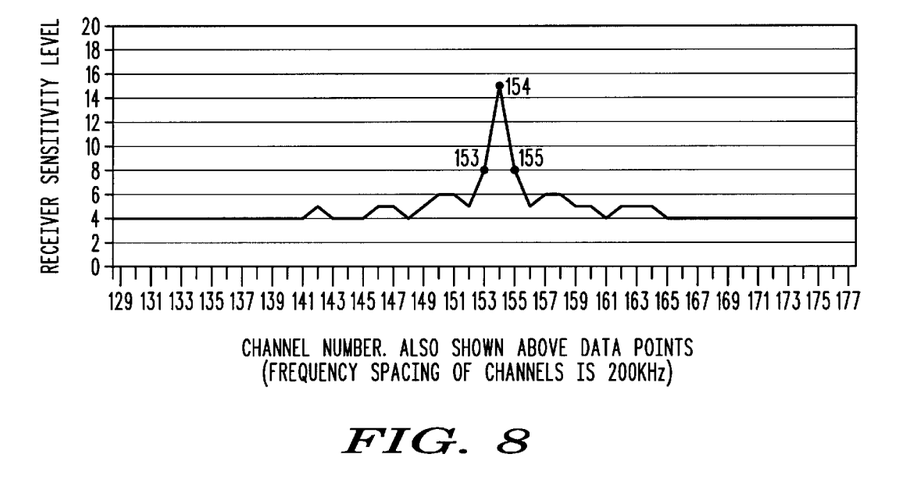
FIG. 8 illustrates exemplary plots of receiver sensitivity versus radio channel with a toggle function disabled.
Figure 9:
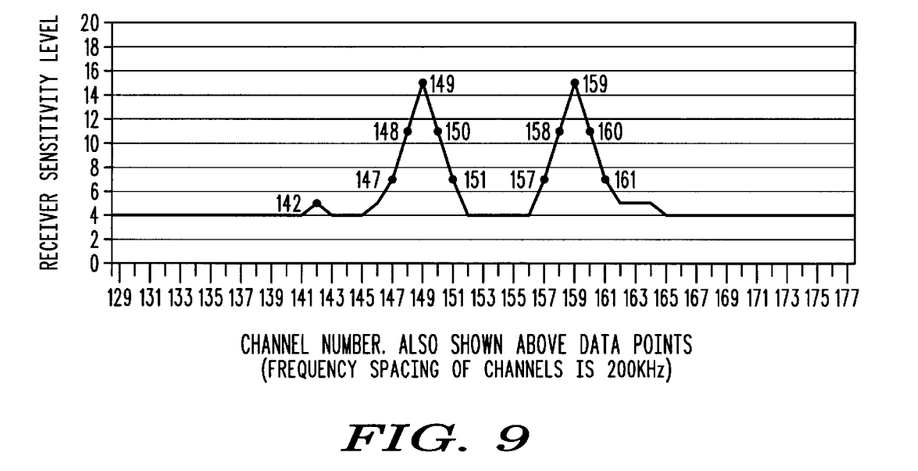
FIG. 9 illustrates the receiver sensitivity versus channel frequency with the toggling function enabled.

FIG. 8 illustrates the receiver sensitivity versus channel frequency with the toggling function disabled. FIG. 9 illustrates the receiver sensitivity versus channel frequency with the toggling function enabled. On the plot of sensitivity with the toggling function disabled, peaks in the sensitivity at channels 153, 154 and 155 indicate receiver desensitization due to radiation of digital signal harmonics, centered on channel 154. On the plot of sensitivity with the toggling function enabled the desensitization is removed on channels 153, 154 and 155, and shifted to channel above and below these. In normal operation the toggling function would be enabled for channels 153, 154 and 155, and disabled for the other channels shown.

The method of this invention is preferably implemented on a programmed processor. However, the toggle controller 110 and controller 410 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. For example, features of the controller 110 may be interchanged with functions of the controller 410. Accordingly, the preferred embodiments of the invention as set forth herein are intended to be illustrative, not limiting. Various changes may be made without departing from the spirit and scope of the invention.

What is claimed is:

1. A method for eliminating interference caused by spurious signals in communication signals communicated via a communication device on any one of a plurality of different channels, the communication device operating at a rate set by a system clock frequency, the method comprising the steps of:

generating the system clock frequency at a first frequency, the first frequency generating spurious signals on at least one of the plurality of different channels;

toggling the system clock frequency by a first amount to a second frequency when the communication device is to be tuned to at least one of the plurality of different channels so as to remove the spurious signals from the at least one of the plurality of different channels;

tuning the communication device to at least one of the plurality of different channels; and synchronizing a return of a timing error to a predetermined value at a start of a receive data capture event.

2. The method according to claim 1, wherein the predetermined value is zero.

3. The method according to claim 1, wherein the synchronizing step returns the timing error to a predetermined value by shifting the system clock signal a second amount to a third frequency after the step of tuning.

4. The method according to claim 1, further comprising toggling the system clock frequency a second amount to a third frequency, the second amount being equal to twice the first amount plus an offset amount.

5. The method according to claim 1, wherein the synchronization step is a function of the first amount.

6. The method according to claim 1, further comprising synchronizing a return of the system clock to the first frequency with the timing error being a predetermined value.

7. An apparatus for eliminating interference caused by spurious signals in communication signals communicated via a communication device on any one of plurality of different channels, the communication device operating at a rate set by a system clock frequency, the apparatus comprising:

timing circuitry configured to output the system clock frequency at a nominal frequency, the nominal frequency generating spurious signals on a selected one of the plurality of different channels; and a controller coupled to the timing circuitry, the controller configured to toggle the system clock frequency by a first predetermined amount to a second frequency when the communication device is to be tuned to at least one of the plurality of different channels so as to remove the spurious signals from the at least one of the plurality of different channels, tune the communication device to said at least one of the plurality of different channels, and synchronize a return of the timing error to a predetermined value at a start of a receive data capture event.

* * * * *